United States Patent [19]

Ziolkowski

[11] 3,972,813
[45] Aug. 3, 1976

[54] METHOD OF REMOVING SOLID PARTICLES FROM A MIXTURE COMPRISING A VISCOUS LIQUID, AND SEPARATOR FOR THE CARRYING OUT OF THIS METHOD

[76] Inventor: Roman Ziolkowski, 10, rue Dom Plancher, 21160 Marsannay-la-Cote, France

[22] Filed: Mar. 21, 1974

[21] Appl. No.: 453,552

[30] Foreign Application Priority Data
Mar. 22, 1973 Switzerland.......................... 4146/73

[52] U.S. Cl................................. 210/79; 209/282; 209/283; 209/384; 209/389; 210/396; 210/406; 210/408; 210/413; 210/416 R
[51] Int. Cl.²........................................ B01D 29/38
[58] Field of Search........................... 209/281–283, 209/305, 306, 322, 379, 387, 389, 390, 397, 250, 355, 357, 358, 384; 210/315, 342, 396, 406, 407, 408, 413, 415, 416 R, 79

[56] References Cited
UNITED STATES PATENTS

| | | | |
|---|---|---|---|
| 487,323 | 12/1892 | Ellis............................... | 210/416 X |
| 621,744 | 3/1899 | Bowden......................... | 210/413 X |
| 1,535,750 | 4/1925 | Tracy............................. | 210/416 X |
| 2,407,851 | 9/1946 | Shannon........................ | 209/384 |
| 2,555,725 | 6/1951 | Archbold....................... | 210/407 X |
| 2,663,427 | 12/1953 | Riedel........................... | 210/416 |
| 2,672,239 | 3/1954 | Baril.............................. | 210/407 X |
| 2,771,194 | 11/1956 | Baxter et al................... | 210/416 X |
| 3,252,573 | 5/1966 | Assinck et al................. | 210/389 X |
| 3,285,413 | 11/1966 | Taylor-Smith................. | 209/397 X |
| 3,477,571 | 11/1969 | Maag............................. | 209/250 |
| 3,515,274 | 6/1970 | Wehner......................... | 209/322 |
| 3,547,267 | 12/1970 | Sutherland.................... | 209/379 X |
| 3,708,806 | 1/1973 | Kemper......................... | 210/416 X |

FOREIGN PATENTS OR APPLICATIONS
1,146,011  3/1963  Germany........................... 210/433

*Primary Examiner*—Charles N. Hart
*Assistant Examiner*—Robert G. Mukai
*Attorney, Agent, or Firm*—Robert E. Burns; Emmanuel J. Lobato; Bruce L. Adams

[57] ABSTRACT

A method and separator for removing sugar crystals from a syrup. The syrup is continuously delivered to a space defined by an inner conical first perforated wall subjected to air pressure and an outer conical second perforated wall coaxial with the inner conical wall and subjected to a vacuum from outwardly of the space containing the syrup. The perforations subjected to a vacuum are restricted by projections on a plate that extend axially into corresponding perforations and are movable axially therein to maintain these perforations unobstructed by sugar crystals. Rotationally driven scrapers scrape the inner surfaces of the second perforated wall in synchronism with the projections extending into the perforations.

7 Claims, 1 Drawing Figure

FIG.1

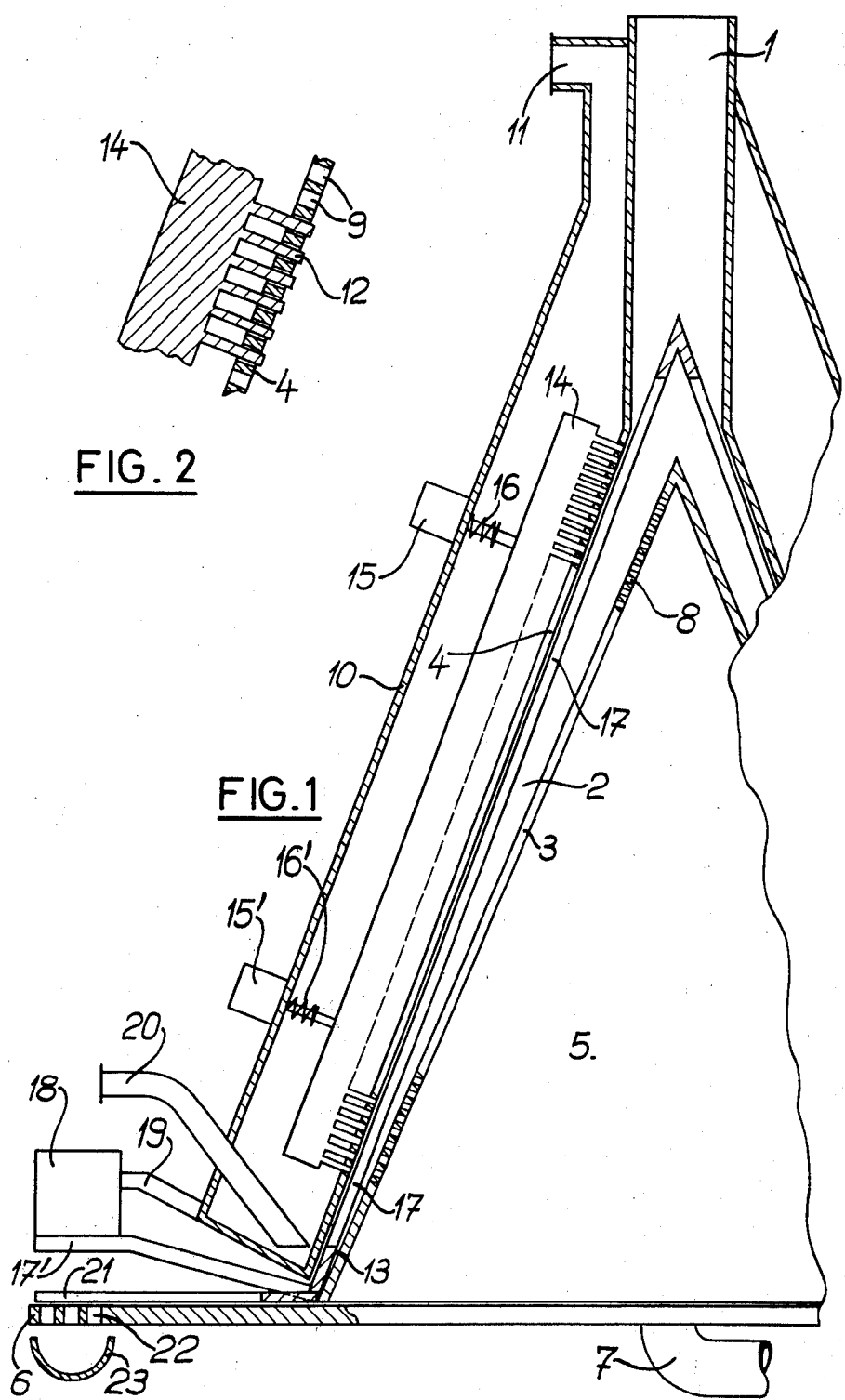

METHOD OF REMOVING SOLID PARTICLES FROM A MIXTURE COMPRISING A VISCOUS LIQUID, AND SEPARATOR FOR THE CARRYING OUT OF THIS METHOD

BACKGROUND OF THE INVENTION

This invention relates generally to a method and apparatus for removing solid particles from a viscous liquid and more particularly to the removal of sugar crystals from a syrup.

The known separators for removing solid particles from a viscous liquid, for example crystals of sugar from molasses, are generally centrifuges. They rely on the effect of centrifugal force. These apparatus can only operate on a batch method and those adapted for continuous operation have not proven satisfactory. Particularly they have not maintained the desired uniformity of the product, and accordingly most sugar mills employ a batch process.

SUMMARY OF THE INVENTION

It is a principal object of the invention to provide a separator and method for continuously removing crystal sugar from a syrup.

According to the invention a method of removing solid particles from a viscous liquid, for example sugar crystals from a syrup comprises confining volumes of the syrup in a space. Air pressure is continuously applied to one side of each volume of syrup at a plurality of local areas. At the same time an opposite side is subjected to a vacuum and the syrup flowed through partially obstructed perforations or passages that restrict or preclude passage of sugar crystals therethrough.

The space for the liquid is defined by an inner conical wall that has perforations subjected to air pressure from externally of the space and a conical outer wall having perforations subjected to a vacuum from externally of the space. The local areas or perforations on the outer wall are restricted by projections or plugs that extend thereinto axially to allow only flow of syrup therethrough and preclude passage of syrup crystals therethrough. These plugs or projections are reciprocably driven to maintain their corresponding perforations unobstructed by the sugar crystals.

Rotationally driven scrapers internally of the space or compartment receiving the viscous liquid scrape the inner surfaces of the outer wall in synchronism with the plugs thereby maintaining the perforations in the outerwall unobstructed by sugar crystals.

The sugar crystals gather at the bottom of the compartment and are removed therefrom. The syrup passing through the outer wall is collected in another compartment and pumped therefrom.

BRIEF DESCRIPTION OF THE DRAWINGS

Other objects and advantages of the separator and method according to the invention will appear from the following description of an example of the invention, and the novel features will be particularly pointed out in the appended claims and drawings in which:

FIG. 1 is a fragmentary schematic elevation view, in section, of a separator according to the invention; and, FIG. 2 is a section view taken along section line 2—2 of FIG. 1.

DESCRIPTION OF A PREFERRED EMBODIMENT

As shown in the drawing a separator carrying out the method of the invention comprises a pipe 1 for delivering a syrup having sugar crystals therein to a compartment 2. The compartment is defined by an inner, conical, perforated wall 3 and a coaxial outer, conical, perforated wall 4 opposed to the inner wall. A space 5 within the inner conical wall and a plate 6 is under air pressure provided through an air pressure conduit 7.

The inner conical wall 3 is provided with perforations 8 through which air pressure is applied to local areas of one side of the volume of syrup in the compartment 2. The outer conical wall 4 has perforations 9 in communication with a second compartment defined by a outermost wall 10 and the intermediate conical wall 4. This second compartment is subjected to a vacuum through a conduit 11 by a vacuum pump, not shown. The perforations on the intermediate wall 4 are accordingly subjected to a vacuum so that local areas of the syrup are subjected to a vacuum and the viscous liquid withdrawn therethrough.

The separator is provided with means for maintaining the perforations for syrup flow unobstructed by sugar crystals that adhere to the inner surfaces of the intermediate wall 4 and do not fall to the bottom of the liquid compartment 2 for removal through an opening 13 at the base of the conical liquid compartment 3.

The perforations 9 in the intermediate wall 4 are partially obstructed by plugs 12 that constitute projections on a plate 14. Each perforation is partially obstructed by a corresponding plug 12 which extends axially therein. The restriction of the perforations forms annular passages 9 that preclude passage of sugar crystals therethrough. Only the liquid syrup can pass therethrough. The plate 14 is movably mounted on the outermost wall 10 by rods extending through this wall and moved by electromagnets 15, 15' mounted on wall 10. These electromagnets are suitably energized to reciprocably drive the plate 14 and plugs or projections 12 reciprocably and axially in their corresponding perforations. This keeps these perforations clear of sugar crystal formations therein. As the plate is oscillated springs 16, 16' restore the plate 14 to its initial position. The plugs are arranged in groups. Each group is mounted on a corresponding plate 14. The plates are arranged spaced in a circumferential direction of the separator.

Within the liquid compartment are arranged a plurality of scrapers 17 that are arranged circumferentially spaced and joined together for joint movement. The scrapers are driven by a circular drive 18 connected to the scrapers by an arm 17' that is connected to a rotary ring, not shown. The drive 18 provides mobile suspension for the scrapers and is mounted on the separator casing 10 by arms 19. The plugs 12 are actuated or reciprocated in synchronism with the scrapers 17 since the plugs extend into the liquid compartment and must be retracted during the scraping of the inner sides of the outer wall 4.

The syrup is removed by a suction line 20 connected to a pump, not shown. The sugar crystals in the liquid mixture space 3 fall toward the bottom outlet 13 and advance over the plate 6. They are freed by scrapers 21 which are attached to the rotary driven scrapers 17 and are pushed through openings 22, on the lower plate 6, into a vat 23 from which they are removed.

The assembly formed by the outer casing 10, the circular drive device 18 and the scrapers 17, 21 are suspended by means of adjustable length rods, not shown, on a hoist, not shown. This allows adjustment of the outer perforated wall 4 relative to the inner perforated wall 3 to vary the size of the liquid mixture compartment 2. The various pipe connections to the separator conduits 11, 20 are flexible to allow for this variable adjustment. By raising and lowering of the housing assembly the regulated interwall spacing between the conical walls allows setting a desired flow rate and adjustment can be effected for particle size.

The application of air pressure causes the air to move through the liquid or syrup and impinge crystals on the wall with perforations under a vacuum. Thus the sugar crystals gather and move downwardly to the outlet 13 of the liquid compartment and the liquid therein thickens.

In order to complete the cleaning the compartment 2 and the compartment under a vacuum are sprayed by a nozzles, not shown, applying water under pressure to the walls. This facilitates separation of the crystals from the molasses and the compartments are maintained clean.

What I claim and desire to secure by Letters Patent is:

1. Apparatus for removing solid particles from a viscous liquid comprising, means defining a compartment into which a flow of a mixture of viscous liquid with solid particles suspended therein is continuously flowed downwardly during operation, said compartment having a first upstanding perforated wall and a second upstanding perforated wall confronting the first perforated wall, means to continuously apply air pressure to the first perforated wall from externally of the compartment into the compartment toward said second perforated wall and to the flowing mixture therethrough, means for keeping said mixture from flowing through the perforations of said second perforated wall, said means comprising a plurality of axially reciprocated partial plugs extending axially into the second perforated wall perforations from externally of the compartment to keep particles from filling and passing through said perforations and to restrict flow therethrough to only said flow of liquid, means to selectively reciprocably actuate the plugs axially into said compartment to maintain the perforations of said second perforated wall clean and unobstructed, means for supplying said mixture into said compartment, means isolated from the means to continuously apply air pressure for applying a vacuum to the perforations of the second perforated wall from externally of the compartment to effect said flow of liquid therethrough, means to collect the liquid passing out from said compartment through the perforations of said second perforated wall, a plurality of driven scrapers in said compartment, said scrapers been constructed and arranged for scraping inner surfaces of the second perforated wall to remove solid particles therefrom when said plugs are retracted from said compartment, and means to remove solid particles collected in the bottom of said compartment.

2. Apparatus for removing solid particles from a viscous liquid according to claim 1, in which said first perforated wall is conically configured, and in which said second perforated wall is disposed outwardly thereof and is frusto-conically configured and of larger dimension than the first perforated wall, and the perforated walls are disposed coaxially and have bases disposed downwardly.

3. Apparatus for removing solid particles from a viscous liquid according to claim 1, in which said scrapers are circumferentially spaced for scraping the inner surfaces of the second perforated wall to maintain the perforations thereof unobstructed, and means for driving said scrapers from externally of said compartment.

4. Apparatus for removing solid particles from a viscous liquid according to claim 3, in which said means to selectively reciprocably actuate the plugs comprises means actuating the plugs axially in synchronism with the driven scrapers.

5. Apparatus for removing solid particles from a viscous liquid according to claim 4, in which said means for driving said scrapers comprises means to drive said scraper rotationally.

6. A method of removing solid particles from a viscous liquid comprising, confining volumes, of a flow of viscous liquid having solid particles suspended therein in an inclined space, continuously applying air pressure from externally of said space to one inclined side of the viscous liquid volume in said space on a plurality of local areas on the surface of said side of the volume of viscous liquid while simultaneously continuously applying a vacuum to a plurality of restricted local areas on an opposite inclined side of the volume of viscous liquid to flow the entire flow of viscous liquid through restricted passages corresponding with said local areas under vacuum and dimensioned to preclude passage of said solid particles therethrough, whereby the solid particles are retained in the space in which said volume of viscous liquid is confined, selectively mechanically removing solid particles entrained in said restricted passages into said space while applying said vacuum and flowing said liquid therethrough, mechanically scraping off solid particles in said space from a boundary thereof defining and confining the opposite inclined side of the volume of viscous liquid, and removing from a lower part of said space said solid particles.

7. A method of removing solid particles from a viscous liquid according to claim 6, in which said viscous liquid is a syrup and in which said solid particles comprise sugar crystals.

* * * * *